United States Patent
McGrogan et al.

(10) Patent No.: US 8,265,815 B2
(45) Date of Patent: Sep. 11, 2012

(54) METHOD FOR CONTROLLING OUTPUT TORQUE IN POWERTRAINS

(75) Inventors: Sean W McGrogan, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 12/625,604

(22) Filed: Nov. 25, 2009

(65) Prior Publication Data

US 2011/0125352 A1 May 26, 2011

(51) Int. Cl.
*B60L 9/00* (2006.01)

(52) U.S. Cl. ............... 701/22; 701/51; 701/54; 701/84; 701/87; 477/7; 477/69; 477/79; 477/115; 180/65.1; 903/915; 903/907; 475/76; 475/94; 475/125

(58) Field of Classification Search ............... 701/22, 701/51, 54, 84, 87, 90; 477/7, 69, 79, 115; 180/65.1; 903/915, 967; 475/76, 94, 125
See application file for complete search history.

(56) References Cited

U.S. PATENT DOCUMENTS

| 4,185,521 | A | * | 1/1980 | Beals | 477/69 |
| 5,090,511 | A | * | 2/1992 | Kabasin | 180/197 |
| 6,012,676 | A | * | 1/2000 | Gold et al. | 244/17.13 |
| 6,910,990 | B2 | * | 6/2005 | Doering et al. | 477/110 |
| 7,219,000 | B2 | * | 5/2007 | Steinmetz et al. | 701/51 |
| 2004/0259684 | A1 | * | 12/2004 | Kresse et al. | 477/115 |
| 2005/0256623 | A1 | * | 11/2005 | Hubbard et al. | 701/54 |
| 2006/0175997 | A1 | * | 8/2006 | Hommi et al. | 318/432 |
| 2011/0125352 | A1 | * | 5/2011 | McGrogan et al. | 701/22 |

* cited by examiner

*Primary Examiner* — Redhwan K Mawari
(74) *Attorney, Agent, or Firm* — Quinn Law Group, PLLC (57) ABSTRACT

A method of controlling output torque in a hybrid or electric vehicle transmissions includes calculating a first long-term output torque constraint and a first short-term output torque constraint. A first effective output torque constraint is determined from at least one of the first long-term and short-term output torque constraints. The first effective output torque constraint is bounded by both of the first long-term and short-term output torque constraints. The method may further include calculating a rate limit, such that determining the first effective output torque constraint includes restricting the magnitude of changes in the first long-term output torque constraint to the calculated rate limit. A spread between the first short-term output torque constraint and the first effective output torque constraint may be measured, and the rate limit calculated as a function of that spread. The rate limit may also be calculated with an inversely-proportional relationship to the spread.

10 Claims, 4 Drawing Sheets

METHOD FOR CONTROLLING OUTPUT TORQUE IN POWERTRAINS

TECHNICAL FIELD

This disclosure relates to determination of output torque constraints for powertrains used in alternative energy vehicles, such as electric vehicles or hybrid vehicles.

BACKGROUND OF THE INVENTION

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston type internal combustion engine (ICE).

Hybrid vehicles utilize multiple, alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines (motor/generators) that operate individually or in concert with the internal combustion engine to propel the vehicle.

The electric machines convert kinetic energy into electric energy which may be stored in an energy storage device. The electric energy from the energy storage device may then be converted back into kinetic energy for propulsion of the vehicle. Electric vehicles also include one or more electric machines and energy storage devices used to propel the vehicle.

SUMMARY

A method of controlling output torque in a transmission for a hybrid or electric vehicle is provided. The method includes calculating a first long-term output torque constraint and a first short-term output torque constraint. A first effective output torque constraint is determined from at least one of the first long-term output torque constraint and the first short-term output torque constraint. The first effective output torque constraint is bounded by both of the first long-term and short-term output torque constraints.

The method may further include calculating a rate limit, such that determining the first effective output torque constraint includes restricting the magnitude of changes in the first long-term output torque constraint to the calculated rate limit. A spread between the first short-term output torque constraint and the first effective output torque constraint may be measured, and the rate limit calculated as a function of that spread. The rate limit may also be calculated with an inversely-proportional relationship to the spread. The method may be utilized to determine both an effective maximum output torque constraint and an effective minimum output torque constraint.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
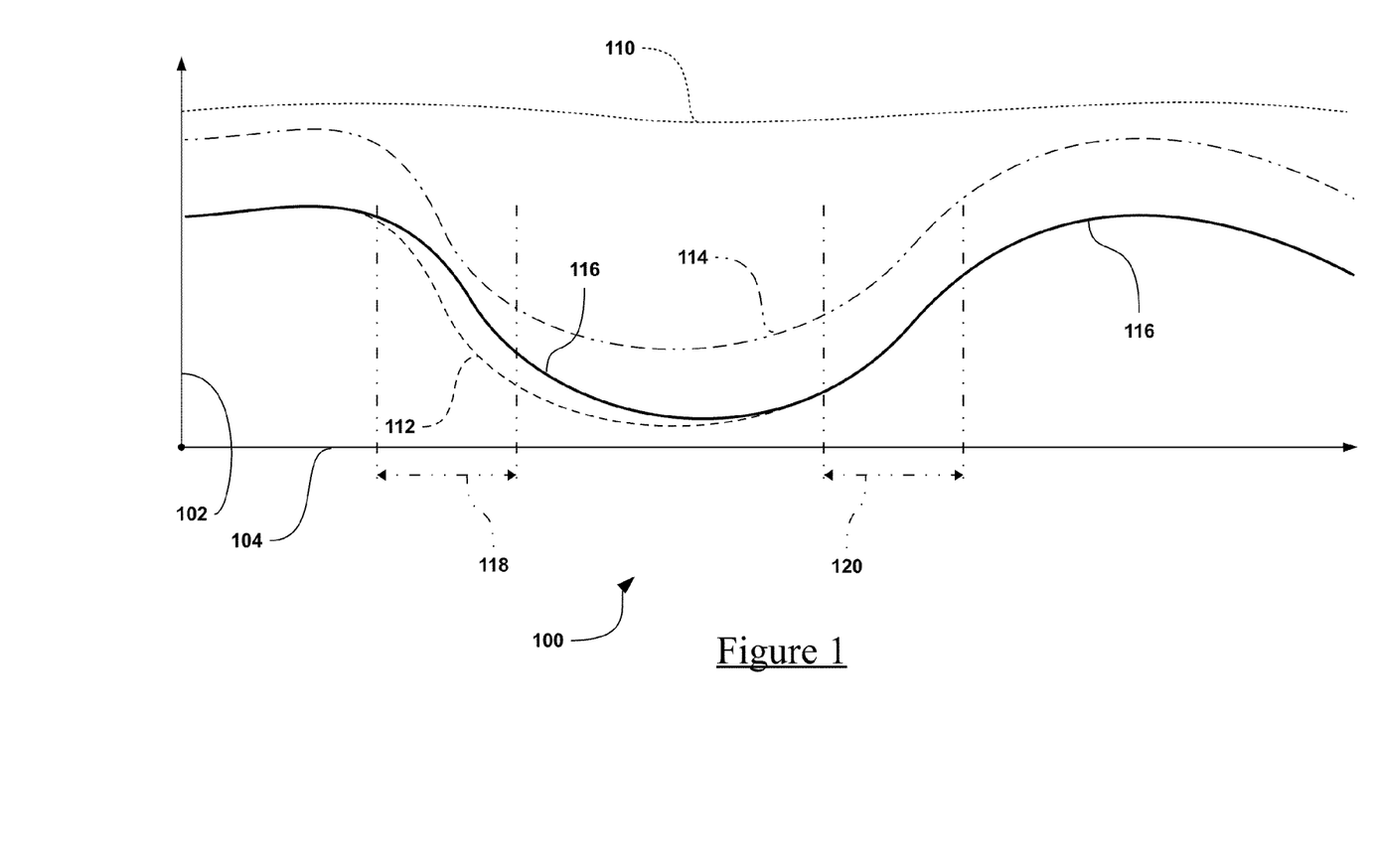
FIG. 1 is a schematic graph of maximum torque constraints and a torque request plotted with respect to time.

Referring to the drawings, wherein like reference numbers correspond to like or similar components throughout the several figures, there is shown in FIG. 1 a schematic graph 100 of torque constraints for a transmission (not shown) in a hybrid or electric vehicle. As used herein, the term hybrid transmission refers generally to any transmission configured for use with multiple power sources (such as an engine and an electric machine), configured for use with purely electric power sources (such as an electric vehicle), or configured for use with other alternative energy traction devices or primary movers. The graph 100 has torque plotted along the y-axis 102 and time plotted along the x-axis 104. The graph 100 (and the axes 102, 104) are illustrative only and the values shown may not be proportional or consistent.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

A torque request 110 is illustrative of the amount of torque requested by the vehicle's driver or by the engine control module (ECM), hybrid control processor (HCP), or another controller. This value may be proportional to the accelerator pedal position, the brake pedal position, a combination of both, or may be derived from other data collected by the controller, such as via a lookup table. The torque request may further be related to output speed of the powertrain or vehicle.

Below the torque request 110 are a set of maximum torque constraints. A maximum long-term torque constraint 112 is calculated based upon considerations such as long-term component durability considerations, mechanical limitations of the components of the transmission, and capability of individual components to carry torque. For instance, the maximum long-term torque constraint 112 includes battery considerations and represents the maximum amount of output torque which, on average, may be sustained over the near future of the battery. Sustained battery power in excess of the long-term battery power limits may render the battery unable to meet its life target of service (usually measured in months or years), because of chemical degradation processes. Furthermore, the maximum long-term torque constraint 112 may take into account the long-term needs of other components, such as, without limitation: multiple motor/generators, multiple clutches, transmission pumps, and the members transferring torque between components within the transmission.

A maximum short-term torque constraint 114 may be calculated based upon considerations such as (without limitation): short-term battery power considerations, short-term motor torque considerations, and short-term clutch torque limits. For example the difference between the long-term and short-term motor torque limits may occur due to current limits of the inverter.

Both the maximum long-term torque constraint 112 and maximum short-term torque constraint 114 may be determined by a controller or processor. The output torque may be used to limit the amount of torque transferred from the hybrid transmission to, for example, the vehicle's final drive. Furthermore, the maximum long-term torque constraint 112 and maximum short-term torque constraint 114 may be used to map the allowable positive and negative torque for one or more electric machines. Controlling the torque of the electric machines controls traction torque from the hybrid transmission and regenerative capacity of the hybrid transmission.

The maximum short-term torque constraint 114 may represent acceptable, temporary deviations from the maximum long-term torque constraint 112 which will not degrade the durability and performance of the battery or motor(s) over their respective life cycles. Therefore, the maximum long-term torque constraint 112 may be violated for short periods of time without negatively impacting the long-term durability of the battery or the components of the hybrid transmission, as long as the maximum short-term torque constraint 114 is not also violated.

During the period shown in FIG. 1, the maximum long-term torque constraint 112 and maximum short-term torque constraint 114 are both below the torque request 110. Therefore, the torque request 110 cannot be satisfied without violating these constraints. This represents a situation in which the hybrid transmission is riding its output torque constraints while attempting to meet the torque request 110 and satisfy the drivability needs of the driver. The hybrid transmission may be riding its torque constraints when battery power limits (both accepting and discharging charge) are tight, such as (without limitation) during periods of extreme hot, extreme cold, high altitude, or high engine coolant temperature.

During both acceleration and blended braking, the maximum torque constraints 112, 114 can change abruptly, which often results in violation of the driver's output torque request 110 and may therefore decrease drivability. The maximum torque constraints 112, 114 may change abruptly, for example, and without limitation: due to an abrupt change in engine torque or an abrupt change in battery power needed to satisfy input/output speed requests.

As described herein, an effective maximum torque constraint 116 represents the actual maximum output torque at which the hybrid transmission is operated. The effective maximum torque constraint 116 is determined by a controller (not shown), which may be part of the hybrid control processor, another part of the powertrain control architecture, or a separate module handling only output torque constraints.

In order to extend the life cycle of the battery to its life cycle goals, the effective maximum torque constraint 116 normally coincides with the maximum long-term torque constraint 112. However, when the maximum torque constraints tighten at a high rate—as shown in FIG. 1, where the maximum torque constraints 112, 114 move rapidly away from the torque request 110—the driver may experience a significant sag in output torque as the maximum long-term torque constraint 112 decreases. If the controller commands that the transmission follow this sag in maximum long-term torque constraint, this torque sag may be negatively perceived by the driver, or may be misinterpreted as a malfunction of the hybrid transmission.

In order to improve drivability, while still maintaining the long-term durability of the battery, the hybrid transmission may be configured to vary the effective maximum torque constraint 116 away from the maximum long-term torque constraint 112 for short periods of time, i.e. the controller allows short-term violations of the long-term constraints. However, in order to maintain the long-term durability of the hybrid transmission and to maximize drivability, the effective maximum torque constraint 116 is bounded by both of the maximum long-term torque constraint 112 and the maximum short-term torque constraint 114. The maximum long-term torque constraint 112 acts as a boundary because there is generally no need to reduce output torque below the maximum long-term torque constraint 112, and the maximum short-term torque constraint 114 acts as a boundary to prevent degradation of the long-term durability of battery.

Drivability may be more noticeably affected by rapidly decreasing the maximum long-term torque constraint 112, because the driver is less likely to notice a slowly decreasing maximum long-term torque constraint 112. The slower change is less noticeable to the driver. Therefore, the effective maximum torque constraint 116 may be configured as a rate-limited long-term constraint, and only configured to only limit the rate when the maximum long-term torque constraint 112 is decreasing (e.g. when the torque constraints are tightening).

As shown in FIG. 1, a zone 118 demonstrates a time period in which the effective maximum torque constraint 116 is being calculated by rate-limiting the decline of maximum long-term torque constraint 112. Therefore, the effective maximum torque constraint 116, and the torque felt by the driver, decreases at a slower rate than the maximum long-term torque constraint 112, which may improve drivability. However, as shown in FIG. 1, unless the magnitude of the rate limit that is used in determining the effective maximum torque constraint 116 increases, the effective maximum torque constraint 116 may eventually cross over the maximum short-term torque constraint 114.

The rate limit used to determine the effective maximum torque constraint 116 is calculated as a function of the maximum short-term torque constraint 114. More specifically, the rate limit may be calculated as a function of the difference, or spread, between the effective maximum torque constraint 116 and the maximum short-term torque constraint 114.

As shown in zone 118, the effective maximum torque constraint 116 is inversely related to the spread. Therefore, as the spread narrows, and the effective maximum torque constraint 116 nears the maximum short-term torque constraint 114, the rate limit increases in order to keep the effective maximum torque constraint 116 from running into the maximum short-term torque constraint 114. Because the maximum short-term torque constraint 114 acts as a boundary for the effective maximum torque constraint 116, intersection of the two constraints may again result in rapid (non-rate-limited) changes in output torque.

Additionally, the rate limit may be calculated as a function of the torque request 110. The rate limit may be stored as a two-dimensional lookup table having values of the rate limit as a function of the spread between the effective maximum torque constraint 116 and the maximum short-term torque constraint 114 and a function of the torque request 110.

If the controller is not able to increase the rate of decline of the effective maximum torque constraint 116 quickly enough to prevent it from intersecting the maximum short-term torque constraint 114, the controller will switch the effective maximum torque constraint 116 to the maximum short-term torque constraint 114 (this situation is not shown in the figures). The effective maximum torque constraint 116 would then ride the maximum short-term torque constraint 114, which acts as an absolute boundary, until the rate limit calculation brings the effective maximum torque constraint 116 back away from the maximum short-term torque constraint 114 toward the maximum long-term torque constraint 112.

Once the maximum long-term torque constraint 112 stops decreasing at a high rate, or begins to increase, the effective maximum torque constraint 116 will gradually move toward the maximum long-term torque constraint 112 until the two merge. The maximum short-term torque constraint 114 and maximum long-term torque constraint 112 are shown in FIG. 1 as having a substantially-constant relationship (e.g. the difference between the two is relatively consistent as the constraints move). However, the two maximum constraints 112, 114 may not always have a fixed or proportional relationship, such that the gap between the two may widen or narrow as conditions change.

As further shown in FIG. 1, in a zone 120 the maximum long-term torque constraint 112 increases at a high rate of change. However, because this rate of change involves widening constraints (i.e. the constraints are becoming less restrictive) which brings the minimum long-term torque constraint 112 closer to the violated torque request 110, the minimum long-term torque constraint 112 is not rate limited. In zone 120, the effective maximum torque constraint 116 rides the maximum long-term torque constraint 112, as a boundary limit, and increases at the same rate.

Figure 2:
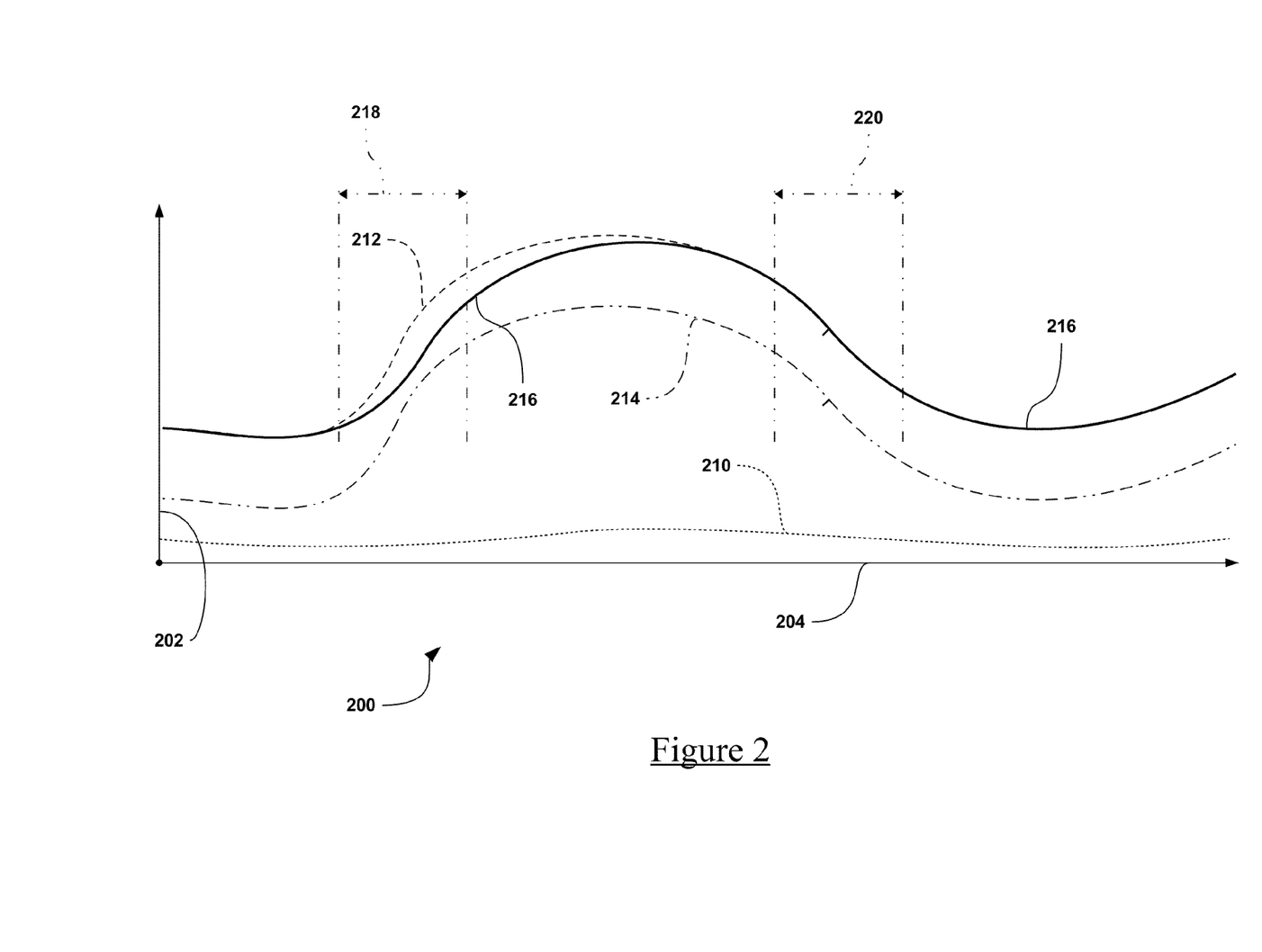
FIG. 2 is a schematic graph of minimum torque constraints and a torque request plotted with respect to time.

Referring now to FIG. 2, and with continued reference to FIG. 1, there is shown a schematic graph 200 of torque constraints for the hybrid transmission. Similar to FIG. 1, the graph 200 has torque plotted along the y-axis 202 and time plotted along the x-axis 204. The graph 200 (and the axes 202, 204) are illustrative only and the values shown may not be proportional or consistent.

A torque request 210 is illustrative of the amount of torque requested by the vehicle's driver or by the HCP. Unlike the graph 100 shown in FIG. 1, the graph 200 is illustrative of a situation in which the torque request 210 is below minimum torque constraints.

A minimum long-term torque constraint 212 is calculated based upon long-term component durability considerations, such as long-term battery considerations. A minimum short-term torque constraint 214 is calculated based upon short-term battery power considerations. The minimum short-term torque constraint 214 may again represent acceptable, temporary deviations from the minimum long-term torque constraint 212 which will not degrade the durability and performance of the battery over its life cycle. Therefore, the minimum long-term torque constraint 212 may be violated for short periods of time without negatively impacting the durability of the battery, the motors, or the hybrid transmission, as long as the minimum short-term torque constraint 214 is not also violated.

During the period shown in FIG. 2, the minimum long-term torque constraint 212 and minimum short-term torque constraint 214 are both above the torque request 210. Therefore, the torque request 210 cannot be satisfied without violating these constraints. This represents a situation in which the hybrid transmission is riding its minimum output torque constraints while attempting to meet the torque request 210 and satisfy the drivability needs of the driver. The hybrid transmission may ride the minimum constraints during (for example, and without limitation) some regenerative braking events, when the vehicle is moving backwards, or where there are tight minimum battery power limits.

As described herein, an effective minimum torque constraint 216 represents the actual minimum output torque at which the hybrid transmission is operated. The effective minimum torque constraint 216 is again determined by the controller.

In order to maximize the life cycle of the battery, the effective minimum torque constraint 216 normally coincides with the minimum long-term torque constraint 212. However, when the minimum torque constraints tighten at a high rate—as shown in FIG. 2, where the minimum torque constraints 212, 214 move rapidly away from the torque request 210—the driver may experience a significant push in output torque as the minimum long-term torque constraint 212 increases away from the torque request 210. This torque push may be negatively perceived by the driver, especially if it causes the vehicle to increase speed during a negative torque request by the driver—such as regenerative braking or blended braking—and may be misinterpreted as a malfunction of the hybrid transmission.

In order to improve drivability, while still maintaining the long-term durability of the battery, the hybrid transmission may be configured to vary the effective minimum torque constraint 216 away from the minimum long-term torque constraint 212 for short periods of time, similar to the variance shown in FIG. 1. The effective minimum torque constraint 216 is again bounded by both of the minimum long-term torque constraint 212 and the minimum short-term torque constraint 214. The minimum long-term torque constraint 212 acts as a boundary because there is generally no need to increase output torque above the minimum long-term torque constraint 212 when the torque request 210 is lower than the constraints; and the minimum short-term torque constraint 214 acts as a boundary to prevent degradation of the battery.

Drivability may be more noticeably affected by rapidly increasing the minimum long-term torque constraint 212, because the driver is less likely to notice a slowly increasing minimum long-term torque constraint 212. The slower change is less noticeable to the driver. Therefore, the effective minimum torque constraint 216 may be configured as a rate-limited long-term constraint, and only configured to only limit the rate when the minimum long-term torque constraint 212 is increasing (i.e. when the torque constraints are tightening).

As shown in FIG. 2, a zone 218 illustrates a time period in which the effective minimum torque constraint 216 is rate-limiting the decline of the minimum long-term torque constraint 212. Therefore, the effective minimum torque constraint 216, and the amount of output torque felt by the driver, increases at a slower rate than the minimum long-term torque constraint 212, which may improve drivability. However, as shown in FIG. 2, the lower rate of decline may eventually cause the effective minimum torque constraint 216 to cross over the minimum short-term torque constraint 214 if the effective minimum torque constraint 216 does not increase its allowable rate limit.

The rate limit used to determine the effective minimum torque constraint 216 is calculated as a function of the minimum short-term torque constraint 214. As discussed regarding the effective maximum torque constraint 116 and shown in FIG. 1, the rate limit may again be calculated as a function of the difference, or spread, between the effective minimum torque constraint 216 and the minimum short-term torque constraint 214.

As shown in zone 218, the effective minimum torque constraint 216 is inversely related to the spread. Therefore, as the spread narrows, and the effective minimum torque constraint 216 nears the minimum short-term torque constraint 214, the rate limit increases in order to keep the effective minimum torque constraint 216 from running into the minimum short-term torque constraint 214. The rate limit may again be calculated as a function of the torque request 210 and stored as a two-dimensional lookup table having values of the rate limit as a function of the spread and either the torque request 210 or the output power request (which is a function of torque request).

The minimum short-term torque constraint 214 will act as an absolute boundary and the effective minimum torque constraint 216 will ride the minimum short-term torque constraint 214 if the two intersect. Once the minimum long-term torque constraint 212 stops increasing at a high rate, or begins to decrease toward the torque request, the effective minimum torque constraint 216 will gradually move toward the minimum long-term torque constraint 212 until the two merge. The minimum long-term torque constraint 212 also acts as an absolute boundary (the upper absolute boundary).

The minimum short-term torque constraint 214 and minimum long-term torque constraint 212 are shown in FIG. 2 as having a substantially-constant relationship (e.g. the difference between the two is relatively consistent as the constraints move). However, the two minimum constraints 212, 214 may not always have a fixed or proportional relationship, such that the gap between the two may widen or narrow as conditions change.

As further shown in FIG. 2, in a zone 220 the minimum long-term torque constraint 212 decreases at a high rate of change. However, because this rate of change involves widening constraints (i.e. the constraints are becoming less restrictive) which brings the minimum long-term torque constraint 212 closer to the violated torque request 210, the minimum long-term torque constraint 212 is not rate limited. In zone 220, the effective minimum torque constraint 216 rides the minimum long-term torque constraint 212, as a boundary limit, and decreases at the same rate.

As shown in FIG. 2, restricting changes in the minimum long-term torque constraint 212 to the rate limit occurs only when the minimum long-term torque 212 constraint is increasing. Otherwise the controller does not override the minimum long-term torque constraint 212 with the effective minimum torque constraint 216. As shown in FIG. 1, restricting changes in the maximum long-term torque constraint 112 to the rate limit occurs only when the maximum long-term torque constraint 112 is decreasing. Otherwise the controller does not override the maximum long-term torque constraint 112 with the effective maximum torque constraint 116.

Figure 3A:
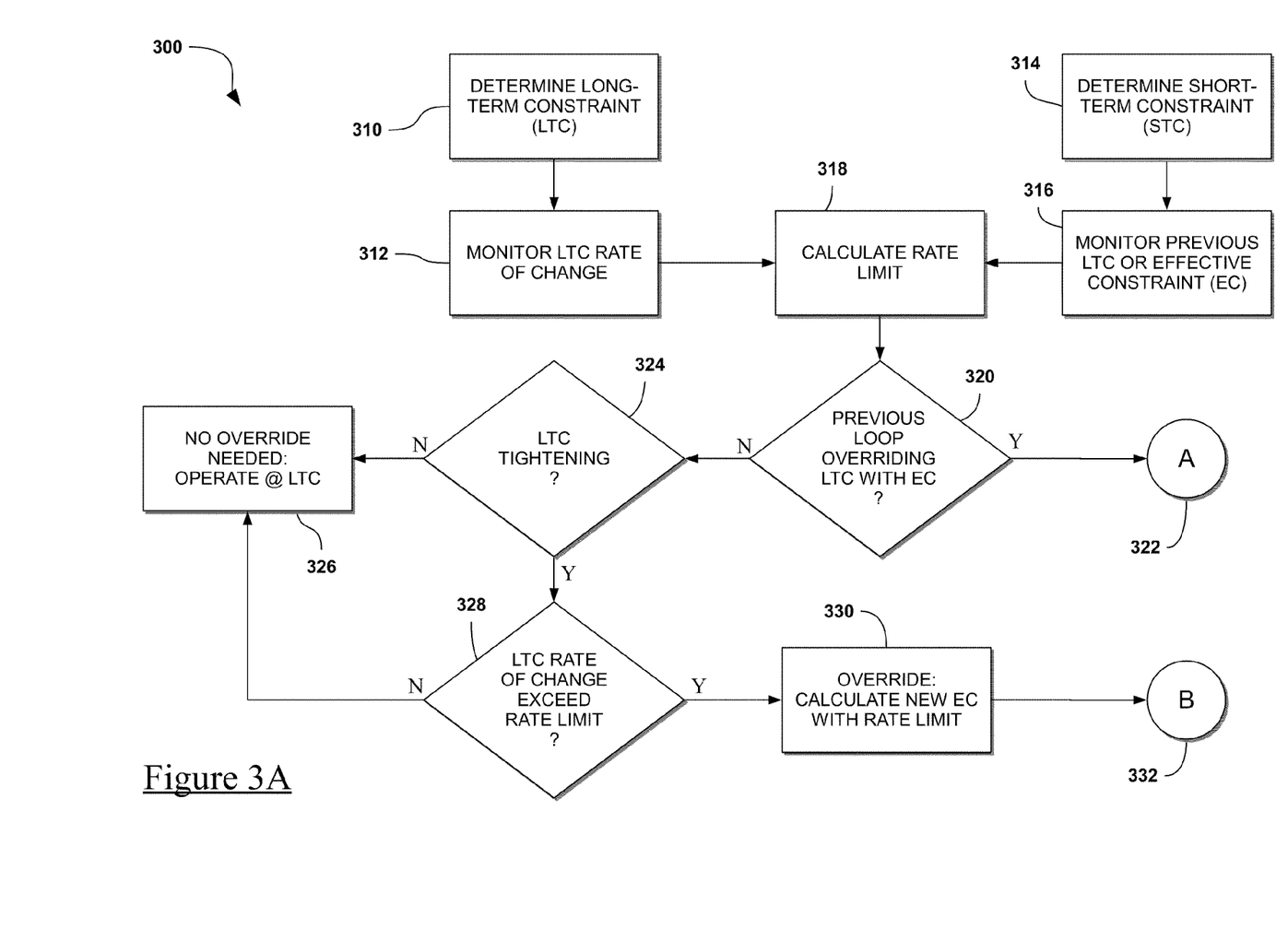
FIG. 3A is a schematic flow chart of a portion of a method or algorithm for determining bounded torque constraints.
Figure 3B:
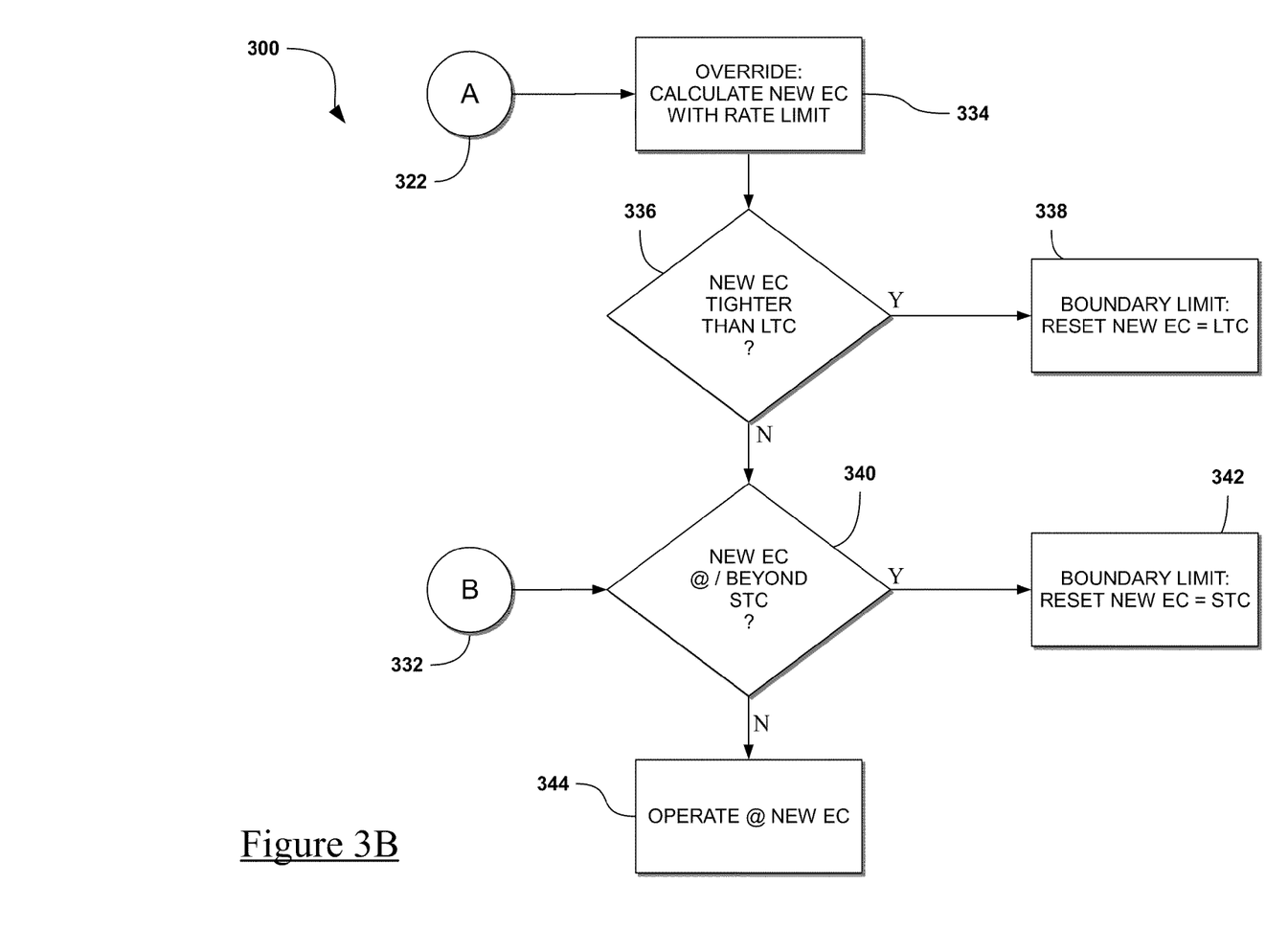
FIG. 3B is a continuation of the method or algorithm for determining bounded torque constraints shown in FIG. 3A.

Referring now to FIGS. 3A and 3B, and with continued reference to FIGS. 1 and 2, there is shown in FIGS. 3A and 3B a schematic flow chart of a method or algorithm 300 for controlling output torque in a hybrid transmission by determining at least one of an effective maximum and minimum output torque constraint (such as 116 and 216). FIG. 3A shows a first portion of the algorithm 300 and FIG. 3B shows a continued portion of algorithm 300. The exact order of the steps of the algorithm 300 shown in FIGS. 3A and 3B may not be required; steps may be reordered, steps may be omitted, and additional steps may be included, as would be recognized by those having ordinary skill in the art.

The algorithm 300 may operate in a looping fashion, as a periodic call-up function from a controller, or may run in a steady-state fashion (constantly calculating and monitoring). Algorithm 300 begins at step 310 by determining a long-term constraint (LTC, such as 112 or 212). The algorithm 300 monitors a rate of change of the long-term constraint at step 312.

Prior to, or contemporaneously with, steps 310-312 the algorithm 300 determines the short-term constraints (STC, such as 114 or 214) at step 314. At step 316, the algorithm 300 monitors the previous long-term constraint or previous effective constraint (EC), so that the algorithm 300 can incorporate the operating conditions under which the transmission is currently, or was just previously, operating. The algorithm 300 may be viewed as always having an effective constraint—at least, after the algorithm 300 has run or looped at least once—such that there will always be both a long-term constraint and an effective constraint, but the two will often be equal. The rate limit is calculated at step 318 from the previous effective constraint (which may be equal to the long-term constraint) and the short-term constraint. Calculating the rate limit may also incorporate the torque request.

Step 320 determines whether or not the previous loop of the algorithm 300 was overriding the long-term constraint by operating the transmission at an effective constraint. If the previous loop was an override, the effective constraint was not equal to, or riding on, the long-term constraint and the algorithm 300 moves to connector A, step 322, which leads the algorithm 300 to FIG. 3B.

However, if the algorithm 300 was not overriding the long-term constraint, the effective constraint is equal to (riding) the long-term constraint. Step 324 will determine whether the long-term constraint is tightening. If the long-term constraint is tightening, the long-term constraint may be moving away from the driver's requested torque (such as 110 or 210), if the torque request is violated (unable to be met).

If step 324 determines that the long-term constraint is not tightening, because the maximum long-term constraint is not decreasing or the minimum long-term constraint is not increasing, no override is needed. Therefore, the algorithm 300 moves to step 326 and operates the transmission at the long-term constraint. However, if step 324 determines that the long-term constraint is actually tightening—such that, using the maximum as an example, the prior maximum long-term constraint is greater than the current maximum long-term constraint—an override (moving the effective constraint away from the long-term constraint) may be preferred in order to maximize drivability by limiting the rate at which the long-term constraint tightens. This is shown in zone 118 of FIG. 1.

At step 328, the algorithm 300 determines whether the rate of change of the long-term constraint is greater than the calculated rate limit. If step 328 determines that the rate of change of the long-term constraint is not greater than the rate limit, no override is needed, and the algorithm 300 again moves to step 326 and operates the transmission at the long-term constraint.

Note that when step 328 compares the rate of change of the long-term constraint to the rate limit, the algorithm 300 is comparing absolute values. When comparing maximum constraints, the calculated rate limit is a negative number, and a highly-negative rate of change is less desirable than a slightly-negative rate of change. If step 328 determines that the rate of change of the long-term constraint exceeds the rate limit, an override of the long-term constraint may be preferred.

At step 330, the algorithm 300 calculates a new effective constraint with the rate limit. The new effective constraint may be calculated by gradient-limiting the long-term constraint with the calculated rate limit. Following calculation of the new effective constraint, the algorithm proceeds to connector B, step 332, which will check the new effective constraint for applicable boundary limits.

Referring now to the portion of the algorithm 300 shown on FIG. 3B, after determining that the previous loop had been overriding the long-term constraint, the connector A leads algorithm 300 to FIG. 3B. At step 334, the previous effective constraint is replaced with a new effective constraint calculated with the rate limit.

Step 336 determines whether the new effective constraint is tighter than the long-term constraint, which acts as a boundary limit for the effective constraint. Numerically, in the case of the maximum effective constraint (similar to FIG. 1), step 336 determines whether the new effective constraint is less than or equal to the long-term constraint. For the minimum effective constraint (similar to FIG. 2), step 336 determines whether the new effective constraint is greater than or equal to the long-term constraint.

If the effective constraint has crossed-over the long-term constraint, the algorithm 300 applies a boundary limit to the effective constraint. At step 338 the new effective constraint is reset to the long-term constraint.

However, if the effective constraint is not less than or equal to the long-term constraint, the algorithm 300 proceeds to step 340 to determine whether the short-term constraint needs to be implemented as a boundary limit. Connecter B also leads to step 340, such that either of the new effective constraints calculated in steps 330 or 334 is checked for the violation of the short-term constraint. Alternatively, steps 330 and 334 could be combined, such that even the first-loop of overridden long-term constraint (where the effective constraint has just come away from the long-term constraint line) is checked for the violation of the long-term constraint boundary limit.

At step 340, the algorithm 300 determines whether the new effective constraint is at or beyond the short-term constraint, which always acts as a boundary limit for the effective constraint. Numerically, in the case of the maximum effective constraint (similar to FIG. 1), step 340 determines whether the new effective constraint is greater than or equal to the short-term constraint. For the minimum effective constraint (similar to FIG. 2), step 340 determines whether the new effective constraint is less than or equal to the short-term constraint.

If the new effective constraint is at or beyond the short-term constraint, step 342 boundary limits the new effective constraint by resetting it to the short-term constraint. Therefore, step 342 causes the effective constraints for the transmission to ride the short-term constraint until (at least) the next loop of the algorithm 300. If the new effective constraint is not at or beyond the short-term constraint, no boundary limit is needed from either the short-term or long-term constraints. Therefore, step 344 allows the transmission to operate at the new effective constraint.

As shown in FIGS. 3A and 3B, the output torque constraints for the transmission may be set by algorithm 300 at several points: at step 326, where no override is needed; step 338, boundary limited to the long-term constraint; step 342, boundary limited to the short-term constraint; or step 344, operation at the new effective constraint. The algorithm may then repeat its loop, or wait until called to run again by the controller. The algorithm 300 also stores the resulting output constraint for subsequent use in calculating the rate limit (step 318), determining whether an override is currently in effect (step 320), or for logging operating characteristics of the hybrid transmission.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A method of controlling output torque in a vehicle transmission including at least one electric machine and in electrical communication with a battery, comprising:
   calculating a first long-term output torque constraint with a processor;
   calculating a first short-term output torque constraint with the processor;
   calculating a rate limit with the processor;
   determining a first effective output torque constraint with the processor from the first long-term output torque constraint and the first short-term output torque constraint,
      wherein the first effective output torque constraint is bounded by both of the first long-term output torque constraint and the first short-term output torque constraint,
      wherein determining the first effective output torque constraint includes restricting the magnitude of changes in the first long-term output torque constraint to the rate limit, and
      wherein restricting the magnitude of changes in the first long-term output torque constraint to the rate limit occurs only when the first long-term output torque constraint is tightening; and
   operating the transmission at the first effective output torque constraint determined by the processor.

2. The method of claim 1, further comprising:
   measuring a spread with the processor between the first short-term output torque constraint and the first effective output torque constraint,
   wherein the rate limit is calculated as a function of the spread.

3. The method of claim 2, wherein the rate limit is calculated with an inversely-proportional relationship to the spread.

4. The method of claim 3, wherein the first long-term output torque constraint is a maximum long-term output torque constraint, the first short-term output torque constraint is a maximum short-term output torque constraint, and the first effective output torque constraint is an effective maximum output torque constraint, and further comprising:
   calculating a minimum long-term output torque constraint with the processor;
   calculating a minimum short-term output torque constraint with the processor; and
   determining an effective minimum output torque constraint with the processor by restricting the magnitude of changes in the minimum long-term output torque constraint to the rate limit, wherein the effective minimum output torque constraint is bounded by both of the minimum long-term output torque constraint and the minimum short-term output torque constraint.

5. The method of claim 4:
   wherein restricting changes in the minimum long-term output torque constraint to the rate limit occurs only when the minimum long-term output torque constraint is increasing, and
   wherein restricting changes in the maximum long-term output torque constraint to the rate limit occurs only when the maximum long-term output torque constraint is decreasing.

6. The method of claim 5, further comprising:
   measuring an output torque request with the processor for the transmission,
   wherein the rate limit is further calculated as a function of the output torque request.

7. The method of claim 6,
   wherein the maximum and minimum long-term output torque constraints are calculated based upon long-term battery power limits, and long-term electric machine limits, and
   wherein the maximum and minimum short-term output torque constraints are calculated based upon short-term battery power limits, and short-term electric machine limits.

8. The method of claim 1, wherein the transmission is in electrical communication with a battery,
- wherein the first long-term output torque constraint is calculated based upon long-term battery power limits of the battery, and
- wherein the first short-term output torque constraint is calculated based upon short-term battery power limits of the battery.

9. The method of claim 8, further comprising:
measuring an output torque request for the transmission with the processor,
wherein the rate limit is further calculated as a function of the measured output torque request.

10. The method of claim 9, wherein the first long-term output torque constraint is a maximum long-term output torque constraint, the first short-term output torque constraint is a maximum short-term output torque constraint, and the first effective output torque constraint is an effective maximum output torque constraint, and further comprising:
- calculating a minimum long-term output torque constraint with the processor;
- calculating a minimum short-term output torque constraint with the processor; and
- determining an effective minimum output torque constraint with the processor by restricting the magnitude of changes in the minimum long-term output torque constraint to the rate limit, wherein the effective minimum output torque constraint is bounded by both of the minimum long-term output torque constraint and the minimum short-term output torque constraint.

* * * * *